(12) United States Patent
Bawri

(10) Patent No.: US 10,961,151 B2
(45) Date of Patent: Mar. 30, 2021

(54) ENGINEERED CONCRETE BINDER COMPOSITION

(71) Applicant: SAROJ VANIJYA PRIVATE LIMITED, Kolkata (IN)

(72) Inventor: Binod Kumar Bawri, Kolkata (IN)

(73) Assignee: SAROJ VANIJYA PRIVATE LIMITED, Kolkata (IN)

( * ) Notice: Subject to any disclaimer, the term of this patent is extended or adjusted under 35 U.S.C. 154(b) by 0 days.

(21) Appl. No.: 16/314,860

(22) PCT Filed: Apr. 5, 2017

(86) PCT No.: PCT/IB2017/051937
§ 371 (c)(1),
(2) Date: Jan. 3, 2019

(87) PCT Pub. No.: WO2018/142192
PCT Pub. Date: Aug. 9, 2018

(65) Prior Publication Data
US 2019/0345059 A1    Nov. 14, 2019

(30) Foreign Application Priority Data
Feb. 2, 2017  (IN) .............................. 201731003857

(51) Int. Cl.
| | | |
|---|---|---|
| C04B 7/24 | (2006.01) |
| C04B 7/02 | (2006.01) |
| C04B 7/13 | (2006.01) |
| C04B 7/153 | (2006.01) |
| C04B 22/06 | (2006.01) |
| C04B 24/18 | (2006.01) |
| C04B 24/22 | (2006.01) |
| C04B 103/00 | (2006.01) |
| C04B 103/10 | (2006.01) |
| C04B 103/30 | (2006.01) |

(52) U.S. Cl.
CPC ............... *C04B 7/243* (2013.01); *C04B 7/02* (2013.01); *C04B 7/13* (2013.01); *C04B 7/1535* (2013.01); *C04B 22/064* (2013.01); *C04B 24/18* (2013.01); *C04B 24/223* (2013.01); *C04B 24/226* (2013.01); *C04B 2103/0094* (2013.01); *C04B 2103/10* (2013.01); *C04B 2103/30* (2013.01)

(58) Field of Classification Search
CPC .. C04B 7/02; C04B 7/13; C04B 7/243; C04B 7/1535; C04B 22/064; C04B 24/18; C04B 24/223; C04B 24/226; C04B 2103/0094; C04B 2103/10; C04B 2103/30
See application file for complete search history.

(56) References Cited

FOREIGN PATENT DOCUMENTS

| | | | |
|---|---|---|---|
| CN | 103351687 A | * | 10/2013 |
| CN | 104016635 A | * | 9/2014 |
| CN | 104876459 A | * | 9/2015 |
| CN | 104926258 A | * | 9/2015 |
| CN | 105130224 A | * | 12/2015 |
| KR | 1020040021219 A | * | 3/2004 |

* cited by examiner

*Primary Examiner* — Anthony J Green
(74) *Attorney, Agent, or Firm* — FisherBroyles, LLP

(57) ABSTRACT

A novel engineered concrete binder composition providing overall reduced clinker factor and improved binding properties. The said concrete binder composition includes a primary binder in a ratio of 10-60 weight percent and a secondary binder in a ratio of 40-90 weight percent. The said primary binder is selected from a primary material group having spontaneous hydration property. The said secondary binder is selected from a secondary material group having induced hydration property.

11 Claims, 4 Drawing Sheets

ENGINEERED CONCRETE BINDER COMPOSITION

FIELD OF THE DISCLOSURE

The invention relates to a novel engineered concrete binder composition having overall reduced clinker factor. More specifically, the invention provides a concrete binder composition which minimizes the overall use of the ordinary Portland cement in the concrete industry. Further, the said concrete binder composition facilitates maximum use of the pozzolonic materials in the concrete production. Accordingly, the present invention reduces the overall dependency over the use of ordinary Portland cement in the concrete industry. The said concrete binder composition provides a Macro-Micro-Nano particle lattice arrangement to increase the strength characteristics and durability index of the final concrete material.

BACKGROUND OF THE DISCLOSURE

Concrete is a highly consumable and utilizable man-made product on earth. Infrastructure such as buildings, roads, airports, dams, ports are always considered as the key indicator of the development of a nation. Developing such infrastructure always requires the use of concrete raw/aggregate materials alongwith the ordinary Portland cement. Although the regular use of concrete raw/aggregate materials alongwith the ordinary Portland cement poses a great threat to the environment.

The production of the ordinary Portland cement consumes very high amount of energy and on the other hand produces high amount of $CO_2$. Hence, it is always desirable to minimize the use of ordinary Portland cement in the concrete production. However, concrete infrastructure strength and durability always depends on the ratio of the ordinary Portland cement mixed with the concrete raw materials. On the other hand, minimizing the ordinary Portland cement ratio gives adverse effect on the final strength and durability of the concrete infrastructure.

Hence, it is a continuous attempt by the researchers to produce a concrete composition with the minimum use of ordinary Portland cement. At the same time, it is also desirable to maintain the final strength and durability of the concrete infrastructure. It is also noted that the strength and durability of the concrete infrastructure depends on the particle bonding of the ordinary Portland cement alongwith the concrete raw material particles.

Generally, the ordinary Portland cement particles alongwith the concrete raw/aggregate material particles are closely packed to form the hard rock like concrete structure. The final strength and durability of the concrete infrastructure is the result of the cement reaction chemistry in the presence of the aggregate particles and water to undergo the hydration process. This hydration process alongwith the packing efficiency of the cement and aggregate particles provide high strength to the final concrete structure.

Further, it is a known fact that the improved packing efficiency of the aggregate particles minimizes the amount of cement as required for binding the aggregate particles together to form the hard concrete structure. Accordingly, it is always desirable to produce a concrete binder composition which can provide maximum binding capability to the aggregate particles.

The maximum binding capability can be provided when the cement and the aggregate particles are closely packed in the three dimensional structure. Generally, the ordinary Portland cement ratio is increased to achieve the higher binding capability of the aggregate particles. Further, the cement reaction kinetic is also very important to attain the maximum binding capability of the aggregate particles.

Hence, it is important to provide a concrete binder composition which can provide improved maximum binding capability to the aggregate particles and also have better cement reaction kinetic. Further, it is also desirable to reduce the use of ordinary Portland cement as a cement binder component due to current environmental challenges such as global warming, environmental changes due to large scale mining of the lime stone.

There are conventional methods for attaining the said results of producing closely packed cement and the aggregate particles. The said methods include mixing ordinary Portland cement, fine aggregate materials, course aggregate materials in an optimum percentage to obtain a proper ratio of the particle packing structure. However, still such methods do not provide the optimum particle packing and do not ensure the low usages of the ordinary Portland cement.

Hence, there is a need to produce a concrete binder composition which can provide optimum particle packing and ensures the low usage of the Portland cement. Further, there is also a need to produce a concrete binder composition which can provide the Macro-Micro-Nano particle packing to increase the durability index of the final concrete material.

SUMMARY

In view of the aforesaid needs and shortcomings in the state of the art, in an aspect, the present invention provides a novel engineered concrete binder composition.

It will be apparent to a person skilled in art that the present novel engineered concrete binder composition is adapted to overcome the outdated composition of the ordinary Portland cement and provides improved binding capabilities to the aggregate particles. Further, the present invented novel engineered concrete binder composition have overall reduced clinker factor. Accordingly, the present invention also reduces the overall carbon foot prints of the Portland cement production.

In an aspect, the present concrete binder composition is made up form a primary binder and a secondary binder. The said primary binder is present in a ratio of 10-60 weight percent and the said secondary binder is present in a ratio of 40-90 weight percent of the said concrete binder composition.

The said primary binder is selected from a primary material group having spontaneous hydration property. The said primary binder includes particles having a mode average particle diameter ranging from ¼th to ⅕th of a smallest fine aggregate mode average particle diameter. It is well understood to a person skilled in the art that the said mode average particle diameter of the primary binder can be further modified as per the demand and need of the smallest fine aggregate mode average particle diameter of the particular concrete aggregate raw materials.

In an aspect, the said primary material group is selected but not limited to at least one of a normal Ordinary Portland Cement, a mechanically modified Ordinary Portland Cement, a chemically modified fly ash, a chemically modified blast furnace slag.

Further, the smallest fine aggregate mode average particle diameter is determined by the particle-size distribution (PSD) analysis of a raw concrete material having a smallest fine aggregate fraction.

In an aspect, the said secondary binder is selected from a secondary material group having induced hydration property. Further, the said secondary material group is selected from at least a material imparting pozzolanic activity. Wherein, the said material imparting pozzolanic activity is selected from at least one of a natural pozzolanic material, an artificial pozzolanic material.

Further, the said secondary binder comprises particles having a mode average particle diameter ranging from $1/4^{th}$ to $1/625^{th}$ of the smallest fine aggregate mode average particle diameter. It is well understood to a person skilled in the art that the said mode average particle diameter of the secondary binder can be further modified as per the demand and need of the smallest fine aggregate mode average particle diameter of the particular concrete aggregate raw materials.

In another aspect, the present novel engineered concrete binder composition also contains a chemically activated material and a mechanically modified material. The said chemically activated material and said mechanically modified material are selected from a fly ash, a blast furnace slag, a volcanic ash material, a quartz material, and/or a pozzolanic material.

In another aspect, the present novel engineered concrete binder composition also contains a rheology modifying agent selected from one of lignosulfonate compounds, Polycarboxylate compound, Sulphonated naphthalene formaldehyde, Sulphonated melamine formaldehyde.

In another aspect, the present novel engineered concrete binder composition also contains a pH modulator selected at least from one of hydroxide of alkali metal group, hydroxide of alkaline earth metal group.

In another aspect, the present novel engineered concrete binder composition also contains a reaction activator. The said reaction activator is selected from one of an oxide of the alkaline earth metal group, a hydroxide of the alkaline earth metal group, a carbonate of the alkaline earth metal group.

In yet another aspect, the said primary material group and the said secondary material group of the present novel engineered concrete binder composition form a Macro-Micro-Nano particle lattice arrangement to increase the strength characteristics and durability index of the final concrete material. In other words, the said primary binder and the said secondary binder are adapted to compactly occupy a void formed by a lattice arrangement of the said primary material group and the said secondary material group and vice versa. Accordingly, it is understood that the said primary binder and the said secondary binder are arranged within one and another and vice versa.

Thus, the aspects of the present invention are directed to an environmental friendly concrete binder composition having improved binding property.

Particularly, the present concrete binder composition provides overall reduction of carbon foot prints, overall reduction in clinker factor, improved binding property, optimizing the total water demand, better utilization of pozzolanic materials in concrete production are some examples of the desired benefits achieved by the present invention.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

DESCRIPTION OF THE DRAWING

The advantages and features of the present invention will become better understood with reference to the following detailed description taken in conjunction with the accompanying drawings, in which.

DESCRIPTION OF THE INVENTION

Figure 1:
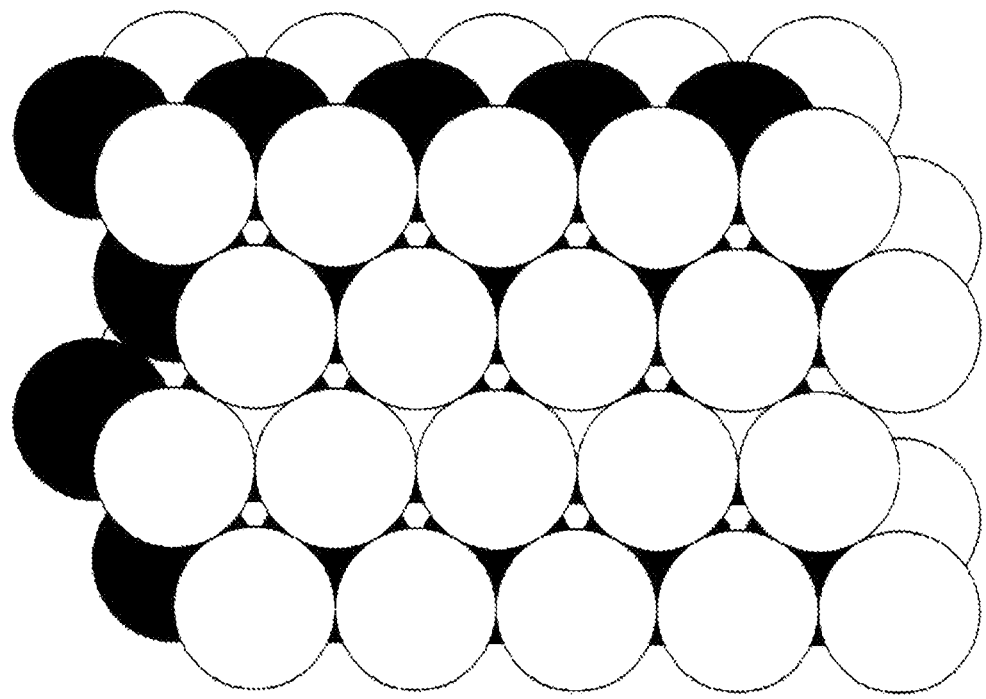
FIG. 1 illustrates the vacant voids at Macro-Micro-Nano level and shows the primary material group bonding based on face centered cubic lattice of the molecules.

The exemplary embodiments described herein detail for illustrative purposes are subjected to many variations. It should be emphasized, however, that the present invention is not limited to the concrete binder composition. It is understood that various omissions and substitutions of equivalents are contemplated as circumstances may suggest or render expedient, but these are intended to cover the application or implementation without departing from the spirit or scope of the present invention.

Unless otherwise specified, the terms, which are used in the specification and claims, have the meanings commonly used in the field of infrastructure construction and cement/concrete industry. Specifically, the following terms have the meanings indicated below.

The terms "a" and "an" herein do not denote a limitation of quantity, but rather denote the presence of at least one of the referenced item.

The terms "having", "comprising", "including", and variations thereof signify the presence of a component.

The term "spontaneous hydration property" refers to early and/or immediate hydration of a material when such material is mixed with water. Tricalcium silicate is an example of such spontaneous hydration property.

The term "induced hydration property" refers to later, slow and/or time dependent hydration of a material when such material is mixed with water. Dicalcium silicate is an example of such induced hydration property.

The term "chemically activated material" refers to a material which is chemically activated to achieve desired chemical reaction and/or results.

The term "mechanically modified material" is understood to mean here a material whose particle size can be modified into a prerequisite particle size by applying a desired force and energy.

The term "pH modulator" is understood to mean here a pH balancing agent. Specifically, in the present invention such "pH modulator" is referred to as a normal base compound which increases the basicity of the matrix.

The term "reaction activator" is understood to mean here a compound which can facilitate a natural pozzolanic reaction to the fly ash.

The term "rheology modifying agent" is understood to mean here a compound which can modify the viscosity and/or initial binding property of the concrete composition.

It should be noted that the term "pozzolanic activity" as referenced hereinbelow means capability of binding calcium hydroxide in the presence of water as understood in the art.

The mode average particle diameter as provided herein is understood to be the peak of the particle frequency distribution curve. In simple words the mode is the highest peak seen in the particle frequency distribution curve. The mode represents the particle size (or size range) most commonly found in the particle frequency distribution curve.

The smallest fine aggregate mode average particle diameter is termed herein as the mode average particle diameter of the smallest fine particles present in the concrete aggregate. The smallest fine aggregate mode average particle diameter thus provides a clear cut idea of lattice arrangement of smallest particle of the concrete aggregate.

Further, the particle-size distribution (PSD) analysis is termed herein as the mathematical expression of finding about the ratio/proportion of various particle size ranges which are present in given concrete aggregate sample. Generally, volume, area, length, and quantity are used as standard dimensions for determining the particle amount present in the concrete aggregate sample. However, volume of the concrete aggregate sample is considered as the easiest dimension and/or way of finding out the ratio of various particle size ranges present in the given concrete aggregate sample.

Due to the current worldwide pressure of decreasing the $CO_2$ emission, all the nations are looking for better technologies and products which produce lower carbon foot prints. Cement production is one of the major industry which produces very high amount of $CO_2$. Hence, it is always desirable to find out better ways of cutting down the overall $CO_2$ release during cement and concrete production. However, still this cannot be considered as the final and total solution of minimizing the $CO_2$ release as cement and concrete production itself releases standard amount of $CO_2$.

There is another solution of reducing the use of cement in the concrete production but still the said cement reduction has adverse effect on the final strength of the concrete infrastructure. Accordingly, the present cement binder is engineered in such a way that it automatically reduces the overall use of cement and at the same time provides improved binding capabilities and higher strength to the final concrete infrastructure.

The concrete binder composition as described in the present invention is a specially engineered concrete binder composition which ensures complete lattice packing of the concrete particles. The said lattice packing is engineered to the Macro-Micro-Nano level to ensure improved durability index of the final concrete structure.

Further, the present concrete binder composition provides a means of better utilization of the pozzolanic materials in their production and at the same time shows enhancement of early strength characteristics despite of a substantial addition of pozzolanic materials.

Accordingly, the present concrete binder composition is made up from at least one primary binder and at least one secondary binder. The said primary binder is present in a ratio of 10-60 weight percent and the said secondary binder is present in a ratio of 40-90 weight percent of the said concrete binder composition.

The said primary binder is selected from a primary material group having spontaneous hydration property. It is to be well understood by a person skilled in the art that materials which shows such spontaneous hydration property can be selected from any one of Tricalcium silicate, Calcium hydroxide, Monosulfate, Monocarbonate and other know materials which shows such spontaneous hydration property. The said primary binder includes particles having a mode average particle diameter ranging from $\frac{1}{4}^{th}$ to $\frac{1}{25}^{th}$ of a smallest fine aggregate mode average particle diameter. It is well understood to a person skilled in the art that the said mode average particle diameter of the primary binder can be further modified as per the mode average particle diameter of the smallest fine aggregate particle of a particular concrete aggregate material.

In a preferred embodiment, the said primary material group is selected from but not limited to at least one of a normal Ordinary Portland Cement, a mechanically modified Ordinary Portland Cement, a chemically modified fly ash, a chemically modified blast furnace slag. It is to be understood that the mechanically modified Ordinary Portland Cement is termed herein as modifying the Ordinary Portland Cement particle size to a desired size level via any of the process involving application of machines. The grinding, crushing, milling, steam jet milling with superheated steam, particle breakdown by electrical force, particle breakdown by magnetic force should be considered as the examples of application of machines for modifying the Ordinary Portland Cement particle size to a desired size level under the spirit of the present invention.

Further, the smallest fine aggregate mode average particle diameter is determined by the particle-size distribution (PSD) analysis of the raw concrete material.

In a preferred embodiment, the said secondary binder is selected from a secondary material group having induced hydration property. It is to be well understood by a person skilled in the art that materials which shows such induced hydration property can be selected from any one of compounds such as Dicalcium Silicate, Calcium Hydroxide, Fly Ash, materials imparting pozzolanic activity and other know materials which shows such induced hydration property. Wherein, the said materials imparting pozzolanic activity are selected from at least one of a natural pozzolanic material, an artificial pozzolanic material.

In a preferred embodiment, the said artificial pozzolanic material is selected from at least one chemically activated material and at least one mechanically modified material. The said at least one chemically activated material and the said at least one mechanically modified material are selected from a fly ash, a blast furnace slag, a volcanic ash material, a quartz material, and/or a pozzolanic material.

In an exemplary embodiment the said artificial pozzolanic material is selected from materials such as but not limited to Ground Granulated Blastfurnace Slag (GGBS); Lightweight Expanded Clay Aggregate (LECA); Pulverised Fuel Ash (PFA); Calcined Clay (Metastar); Microsilica (MS); Rice Husk Ash (RHA); Red Brick Dust (RBD); Tile and Yellow Brick Dust (YBD).

Further, the said secondary binder comprises particles having a mode average particle diameter ranging from $\frac{1}{4}^{th}$ to $\frac{1}{625}^{th}$ of the smallest fine aggregate mode average particle diameter. It is well understood to a person skilled in the art that the said mode average particle diameter of the secondary binder can be further modified as per the demand and need of the smallest fine aggregate mode average particle diameter of the particular concrete aggregate raw materials.

In yet another embodiment, the present novel engineered concrete binder composition also contains a rheology modifying agent selected from one of lignosulfonate compounds, Polycarboxylate compound, Sulphonated naphthalene formaldehyde, Sulphonated melamine formaldehyde.

In yet another embodiment, the present novel engineered concrete binder composition also contains a pH modulator selected at least from one of hydroxide of alkali metal group, hydroxide of alkaline earth metal group. It is to be understood by a person skilled in the art that such pH modulator can be selected from at least one of a sodium hydroxide, potassium hydroxide, magnesium hydroxide, calcium hydroxide. Specifically, the said pH modulator is selected from calcium hydroxide.

In yet another embodiment, the present novel engineered concrete binder composition also contains a reaction activator. The said reaction activator is selected from one of an oxide of the alkaline earth metal group such as magnesium oxide and calcium oxide, a hydroxide of the alkaline earth metal group such as magnesium hydroxide and calcium hydroxide, a carbonate of the alkaline earth metal group such as magnesium carbonate and calcium carbonate.

In an exemplary embodiment, the said pH modulator and the reaction activator are subjected to chemically modify the said pozzolanic materials of the said secondary material group.

In yet another embodiment, the said primary material group and the said secondary material group of the present novel engineered concrete binder composition form a Macro-Micro-Nano particle lattice arrangement to increase the strength characteristics and durability index of the final concrete material. Further, the said secondary binder is adapted to compactly occupy a void formed by a lattice arrangement of the primary material group.

Thus, the aspects of the present invention are directed to an environmental friendly concrete binder composition having improved binding property. Further, the said engineered concrete binder composition improves the overall durability property of the final concrete structure.

Particularly, the present concrete binder composition provides overall reduction of carbon foot prints, overall reduction in clinker factor, improved binding property, better utilization of pozzolanic materials in concrete production are some examples of the desired benefits achieved by the present invention.

Best Mode of Working

The best mode of working of the present invention provides a specially engineered concrete binder composition having compactly packed particle lattice arrangement ranging from Macro to Micro to Nano scale. The said concrete binder composition utilizes much reduced amount of cement materials while preparing the concrete admixture.

Further, the said concrete binder composition contains high volume of pozzolanic materials as cement replacement for achieving maximum possible reduction of carbon footprint. Further, the said concrete binder composition also yields high early strengths as well as promises a high durability index to the finished product, especially concretes and ancillary concrete products.

Specifically, the above said compactly packed particle lattice arrangement ranging from Macro to Micro to Nano scale is the backbone of the present specially engineered concrete binder composition. This particular property is achieved by determining the smallest fine aggregate mode average particle diameter of a given concrete raw material via the particle-size distribution (PSD) analysis. Now, a primary binder and a secondary binder are prepared based on the smallest fine aggregate mode average particle diameter.

The said primary binder comprises particles having a mode average particle diameter ranging from $1/4^{th}$ to $1/25^{th}$ of the smallest fine aggregate mode average particle diameter. The said secondary binder comprises particles having a mode average particle diameter ranging from $1/4^{th}$ to $1/625^{th}$ of the smallest fine aggregate mode average particle diameter. It has to be noted down that such limitations of mode average particle diameter are provided herein for describing the present invention but the mode average particle diameter below these limitations has to be considered as under the scope of the invention.

It is important to freeze the mode average particle diameter of the said primary binder as well as the said secondary binder in relation to the smallest fine aggregate mode average particle diameter (represented as "S0") of a given concrete raw material. The said mode average particle diameter of the said primary binder as well as the said secondary binder is attained via various particle size modification processes and techniques such as but not limited to crushing, grinding, attrition, milling, jet milling with compressed air, jet milling with superheated steam, laser based particle breaking.

In an exemplary embodiment, the mode average particle diameter of the said primary binder and the said secondary binder has to be understood by the examples of S1, S2, S3, S4 . . . SN mode average particle diameter. Where, the 51 mode average particle diameter is understood to be those particles whose mode average diameter is approximately $1/4^{th}$ to $1/5^{th}$ of the smallest fine aggregate mode average particle diameter (S0).

Further, the S2 mode average particle diameter is understood to be the particles whose mode average diameter is approximately $1/4^{th}$ to $1/5^{th}$ of the particles having S1 mode average particle diameter. Accordingly, the S3 mode average particle diameter is understood to be the particles whose mode average diameter is approximately $1/4^{th}$ to $1/5^{th}$ of the particles having S2 mode average particle diameter. Similarly, the S4 mode average particle diameter is understood to be the particles whose mode average diameter is approximately $1/4^{th}$ to $1/5^{th}$ of the particles having S3 mode average particle diameter.

This continuous series of different particle sizes having a defined mode average particle diameter is achieved via various particle size modification techniques ranging from mechanical to chemical treatment. This optimization of different particle sizes having a continuous series of different mode average particle diameters provides a complete packing of the particle lattice structure ranging from Macro-Micro-Nano level. This mixture provides a perfect particle chemistry to fill the maximum voids of the particle lattice structure and also improves concrete chemistry related to the early settings and the latter settings of the concrete material.

Figure 2:
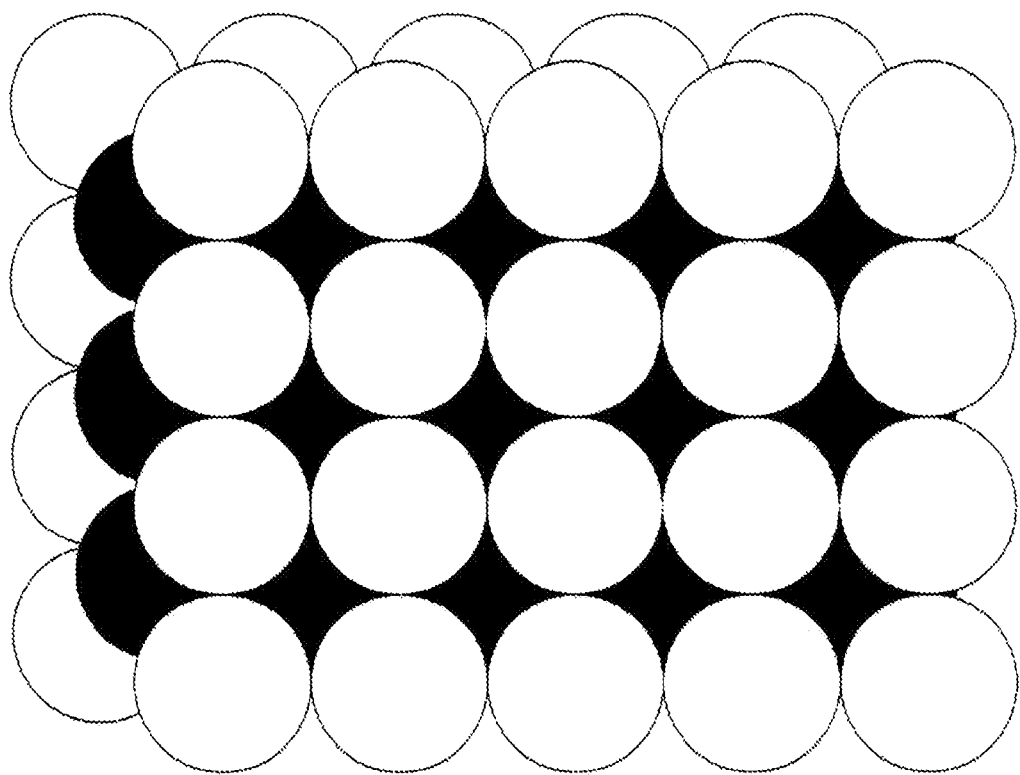
FIG. 2 illustrates the vacant voids at Macro-Micro-Nano level and shows the primary material group bonding based on body centered cubic lattice of the molecules.
Figure 3:
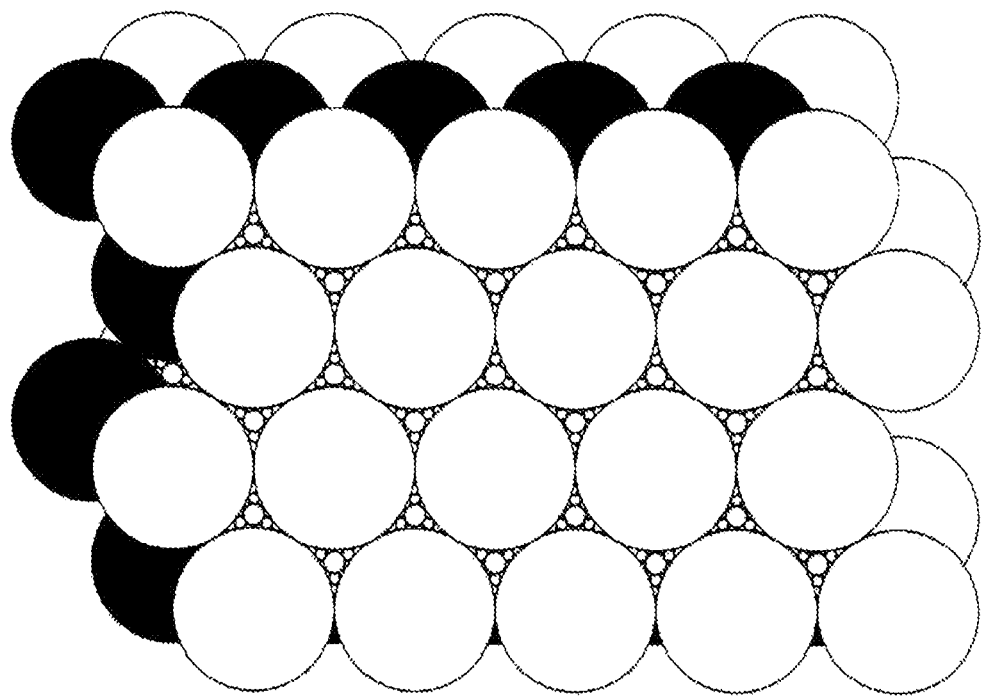
FIG. 3 illustrates the occupied voids of FIG. 1 at Macro-Micro-Nano level by the secondary material group to increase the strength characteristics and durability index of the invention.
Figure 4:
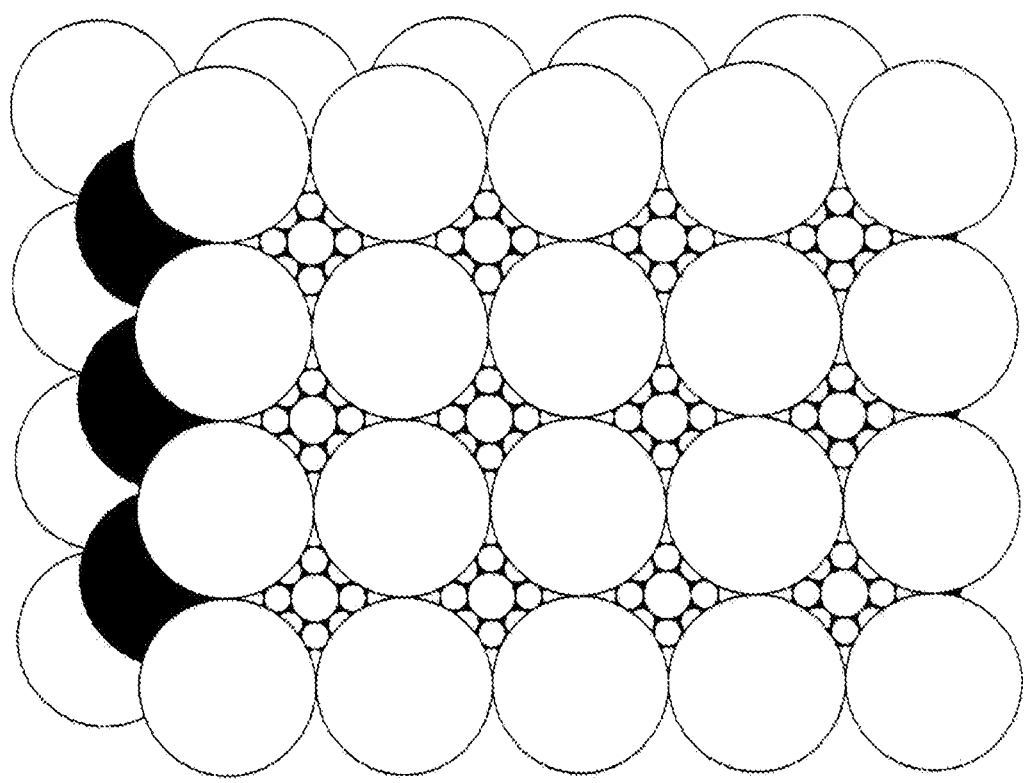
FIG. 4 illustrates the occupied voids of FIG. 2 at Macro-Micro-Nano level by the secondary material group to increase the strength characteristics and durability index of the invention.

Further, FIG. 1 and FIG. 2 illustrate the voids of the Body Centered Cubic (BCC) and Face Centered Cubic (FCC) lattice arrangements respectively. It is to be understood that the said primary binder and the said secondary binder are engineered to occupy this void space as formed by different particle lattice arrangements. The said primary binder and the said secondary binder are compactly arranged to occupy the void of one another particle and vice versa i.e. primary binder compactly packed within secondary binder and secondary binder compactly packed within primary binder and/or primary and secondary binder within primary binder and/or primary and secondary binder within secondary binder. Hence, a complete three dimensional particle packing is obtained for the final concrete binder.

The smallest fine aggregate mode average particle diameter as described herein means the mode average particle diameter of the smallest fine particles of the concrete aggregate. The main purpose for determining the mode average particle diameter of the smallest fine particles of concrete aggregate is to know the optimum void structure of the concrete aggregate. Further, the knowledge of the optimum void structure of the concrete aggregate helps in filing the voids with the specially engineered materials. The said specially engineered materials are selected from at least one of Ordinary Portland Cement, Mechanically Modified Ordinary Portland Cement; and/or materials imparting pozzolonic activity such as but not limited to Ordinary Fly Ash, Mechanically Modified Fly Ash, Chemically Modified Fly Ash, Chemically Modified Blast Furnace Slag, Ground Granulated Blast Furnace Slag (GGBS), Lightweight Expanded Clay Aggregate (LECA), Pulverized Fuel Ash (PFA), Calcined Clay (Metastar), Microsilica (MS), Rice Husk Ash (RHA), Red Brick Dust (RBD), Tile And Yellow Brick Dust (YBD).

All of the above materials are dried and mixed in their respective weight ratios into an appropriate blender to produce the final concert binder composition. The categorization i.e. primary binder and secondary binder and the ratio of such specially engineered materials is to be better understood via the various following examples.

In one exemplary embodiment, the table 1 provides an example of the said concrete binder composition.

TABLE 1

| S. No. | Material | % by weight of total |
|---|---|---|
| | Primary Binders | |
| 1. | Cement OPC 53G of around 3500 blains of size S1 | 30 |
| 2. | Chemically modified fly ash of size S1 | 20 |
| 3. | Cement OPC 53G mechanically modified of size S2 | 10 |
| | Secondary Binders | |
| 1. | Unmodified Fly ash of size S1 | 20 |
| 2. | Mechanically modified fly ash of size S2 | 15 |
| 3. | Mechanically modified fly ash of size S3 or S4 | 3-5 |
| | Other Constituent | |
| 1. | Rheology Modifying Agent | 0.1-2 |

In another embodiment, all these ingredients are blended uniformly in a blender and recommended to be used in a fashion similar to that of using a normal Ordinary Portland Cement (OPC), or normal Portland Pozzolana cement (PPC), or a normal Portland Slag Cement (PSC) used as concrete binders. It is however experimentally verified that by using the said novel engineered concrete binder composition having such significant proportions of micro and Nano particles, the rheology of the concrete mix is also modified, thus reducing the total water demand and thus increasing the final strength of the concrete structure.

In yet another exemplary embodiment, the table 2 provides another example of the said concrete binder composition.

TABLE 2

| S. No. | Material | % by weight of total |
|---|---|---|
| | Primary Binders | |
| 1. | Cement OPC 53G of around 3500 blains of size S1 | 20 |
| 2. | Chemically modified fly ash of size S1 | 20 |
| 3. | Cement OPC 53G mechanically modified of size S2 | 10 |
| | Secondary Binders | |
| 1. | Unmodified Fly ash of size S1 | 30 |
| 2. | Mechanically modified fly ash of size S2 | 18-20 |
| | Other Constituent | |
| 1. | Rheology Modifying Agent | 0.1-2 |

In yet another exemplary embodiment, the table 3 provides another example of the said concrete binder composition.

TABLE 3

| S. No. | Material | % by weight of total |
|---|---|---|
| 1. | Cement original of size S1 | 70 |
| 2. | Cement mechanically modified of size S2 | 20 |
| 3. | Cement mechanically modified of size S3 or S4 | 8-10 |
| | Other Constituent | |
| 1. | Rheology Modifying Agent | 0.1-2 |

After careful experimental observation it is concluded that the present specially engineered concrete binder composition satisfies all the mechanical properties, setting time property, chemical properties, fineness property as well as the production cost as required in the various concrete industry standards.

The present invention provides several other advantages with respect to its use and binding property. The said concrete binder composition utilizes maximum amount of pozzolonic materials instead of ordinary Portland cement and at the same time provides improved strength setting properties as required in the concrete industry.

While the invention has been described with respect to specific composition which include presently preferred modes of carrying out the invention, those skilled in the art will appreciate that there are numerous variations and permutations of the above described embodiments that fall within the spirit and scope of the invention. It should be understood that the invention is not limited in its application to the details of construction and arrangements of the components set forth herein. Variations and modifications of the foregoing are within the scope of the present invention.

Accordingly, many variations of these embodiments are envisaged within the scope of the present invention.

The foregoing descriptions of specific embodiments of the present invention have been presented for purposes of description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

I claim:

1. A novel engineered concrete binder composition having overall reduced clinker factor, the concrete binder composition binding concrete aggregates to produce concrete material, wherein the said concrete binder composition comprises:
   - at least one primary binder in a ratio of 10-60 weight percent, wherein the primary binder is selected from a primary material group having spontaneous hydration property;
   - at least one secondary binder in a ratio of 40-90 weight percent, wherein the secondary binder is selected from a secondary material group having induced hydration property;
   - the said primary binder comprises particles having a mode average particle diameter ranging from $\frac{1}{4}^{th}$ to $\frac{1}{25}^{th}$ of a smallest fine aggregate particle mode average particle diameter, the smallest fine aggregate mode average particle diameter referring to mode average particle diameter of smallest fine particles present in the concrete aggregates;
   - the said secondary binder comprises particles having a mode average particle diameter ranging from $\frac{1}{4}^{th}$ to $\frac{1}{625}^{th}$ of the smallest fine aggregate mode average particle diameter; and
   - the said primary material group and the said secondary material group form a Macro-Micro-Nano particle lattice arrangement to increase strength characteristics and durability index of the concrete material.

2. The novel engineered concrete binder composition as claimed in claim 1, wherein the said smallest fine aggregate mode average particle diameter is determined by the particle-size distribution (PSD) analysis of a smallest fine aggregate fraction of a raw concrete material.

3. The novel engineered concrete binder composition as claimed in claim 1, wherein the primary material group is selected from at least one of a normal Ordinary Portland Cement, a mechanically modified Ordinary Portland Cement, a chemically modified fly ash, a chemically modified blast furnace slag.

4. The novel engineered concrete binder composition as claimed in claim 1, wherein the said secondary material group is selected from at least a material imparting pozzolanic activity.

5. The novel engineered concrete binder composition as claimed in claim 4, wherein the said material imparting pozzolanic activity is selected from at least one of a natural pozzolanic material, an artificial pozzolanic material.

6. The novel engineered concrete binder composition as claimed in claim 5, wherein the said artificial pozzolanic material comprises:
   - a chemically activated material selected from a fly ash, a blast furnace slag, a volcanic ash material, a quartz material, a pozzolanic material; and
   - a mechanically modified material selected from a fly ash, a blast furnace slag, a volcanic ash material, a quartz material, a pozzolanic material.

7. The novel engineered concrete binder composition as claimed in claim 1 further comprises a rheology modifying agent, a pH modulator, a reaction activator.

8. The novel engineered concrete binder composition as claimed in claim 7, wherein the said rheology modifying agent is selected from one of lignosulfonate compounds, Polycarboxylate compound, Sulphonated naphthalene formaldehyde, Sulphonated melamine formaldehyde.

9. The novel engineered concrete binder composition as claimed in claim 7, wherein the said pH modulator is selected at least from one of hydroxide of alkali metal group, hydroxide of alkaline earth metal group.

10. The novel engineered concrete binder composition as claimed in claim 7, wherein the said reaction activator is selected from one of an oxide of the alkaline earth metal group, a hydroxide of the alkaline earth metal group, a carbonate of the alkaline earth metal group.

11. The novel engineered concrete binder composition as claimed in claim 1, wherein the said secondary material group is adapted to compactly occupy a void formed by a lattice arrangement of the said primary material group.

* * * * *